United States Patent [19]

Friedland

[11] Patent Number: 5,583,571
[45] Date of Patent: Dec. 10, 1996

[54] HANDS FREE VIDEO CAMERA SYSTEM

[75] Inventor: Michael Friedland, Avon, Colo.

[73] Assignee: Headtrip, Inc., New York, N.Y.

[21] Appl. No.: 387,364

[22] Filed: Feb. 13, 1995

Related U.S. Application Data

[63] Continuation of Ser. No. 55,725, Apr. 29, 1993, abandoned.

[51] Int. Cl.$^6$ .................................................... H04N 5/225
[52] U.S. Cl. ........................... 348/373; 348/376; 348/158
[58] Field of Search ............................. 348/61, 143, 157, 348/158, 207, 373, 376

[56] References Cited

U.S. PATENT DOCUMENTS

| | | | |
|---|---|---|---|
| 33,402 | 10/1861 | Thrush | 360/33.1 |
| 3,919,475 | 11/1975 | Dukich et al. | 358/225 |
| 4,258,387 | 3/1981 | Lemelson et al. | 358/229 |
| 4,328,917 | 5/1982 | Reeberg | 354/293 |
| 4,450,495 | 5/1984 | Naruki | 360/137 |
| 4,516,157 | 5/1985 | Campbell | 348/158 |
| 4,547,815 | 10/1985 | Kimura | 358/906 |
| 4,792,899 | 12/1988 | Miller | 364/200 |
| 4,797,736 | 1/1989 | Kloots et al. | 358/229 |
| 4,809,079 | 2/1989 | Blazek | 358/906 |
| 4,835,621 | 5/1989 | Black | 358/906 |
| 4,839,675 | 6/1989 | Owen | 354/76 |
| 4,864,481 | 9/1989 | Osman | 363/21 |
| 4,953,766 | 9/1990 | Cruickshank | 354/82 |
| 5,005,213 | 4/1991 | Hanson et al. | 358/108 |
| 5,064,062 | 11/1991 | Miller | 354/82 |
| 5,079,629 | 1/1992 | Oz | 358/229 |
| 5,087,934 | 2/1992 | Johnson | 354/64 |
| 5,090,562 | 2/1992 | Grullemans | 206/320 |
| 5,144,451 | 9/1992 | Yamamoto | 358/254 |

FOREIGN PATENT DOCUMENTS 0118145  9/1984  European Pat. Off. ......... H04N 5/76

*Primary Examiner*—Wendy Garber
*Attorney, Agent, or Firm*—Graham & James LLP

[57] ABSTRACT

A self-contained hands free video recording system conducive for use by individuals who wish to videotape without using their hands to support the video recording system. The camera (4) is supported by a rigid plastic "Z" (3) member or helmet and is designed to direct the focal point of the camera's (4) lens in the same direction as the user's sight, allowing the camera (4) to track and view the same images as the user is seeing with his or her eyes. The protective case case, worn around the waist of the user suppported by a waist band (belt) (13), is designed to separate the recording unit, microphone and the regulated power supply (7) and to protect the recording unit (8) and regulated power supply (7) from damage.

13 Claims, 4 Drawing Sheets

HEADBAND ASSEMBLY

HEADBAND ASSEMBLY
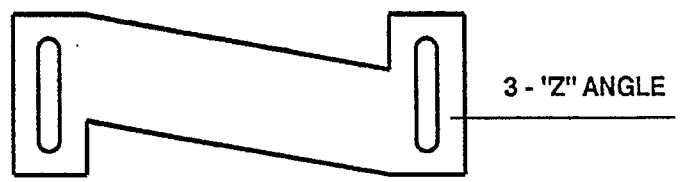
FIGURE 1A — 3 - "Z" ANGLE
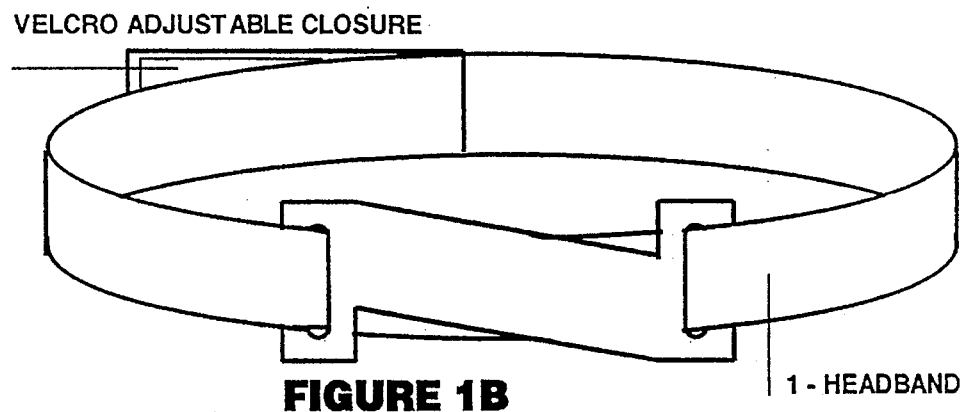
FIGURE 1B — VELCRO ADJUSTABLE CLOSURE; 1 - HEADBAND
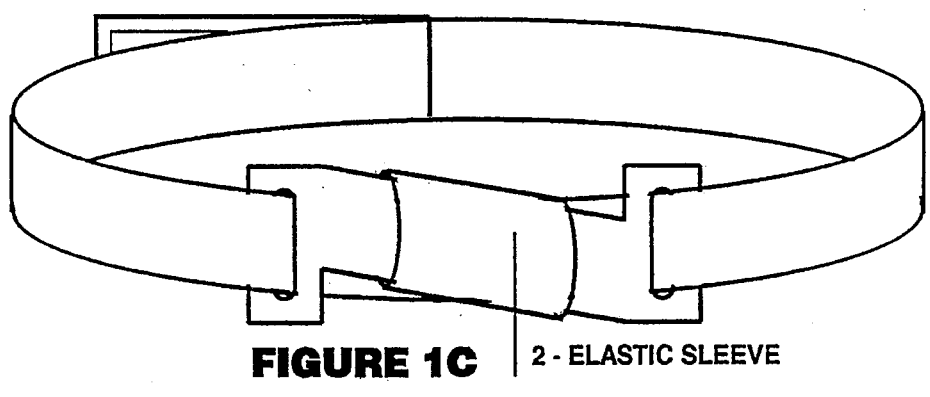
FIGURE 1C — 2 - ELASTIC SLEEVE
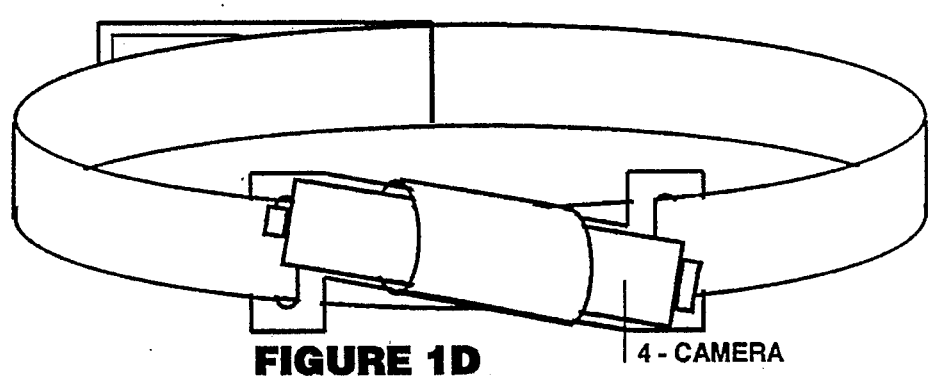
FIGURE 1D — 4 - CAMERA

MAJOR COMPONENT ASSEMBLY

CANVAS BAG ASSEMBLY
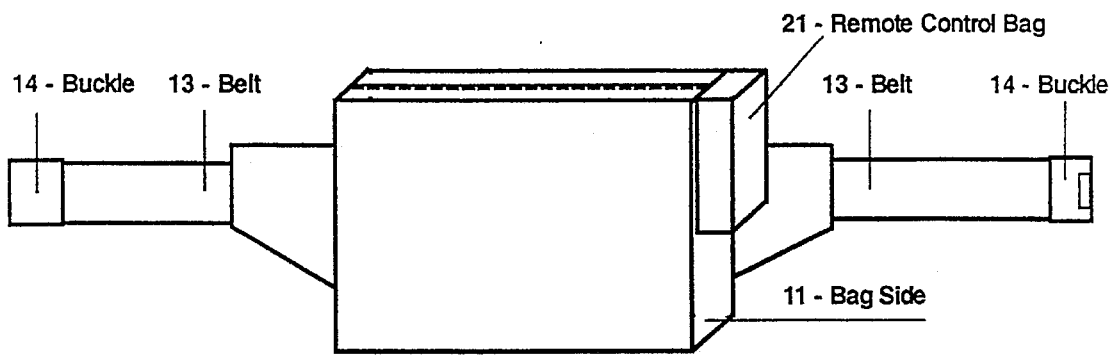
FIGURE 3A FRONT VIEW
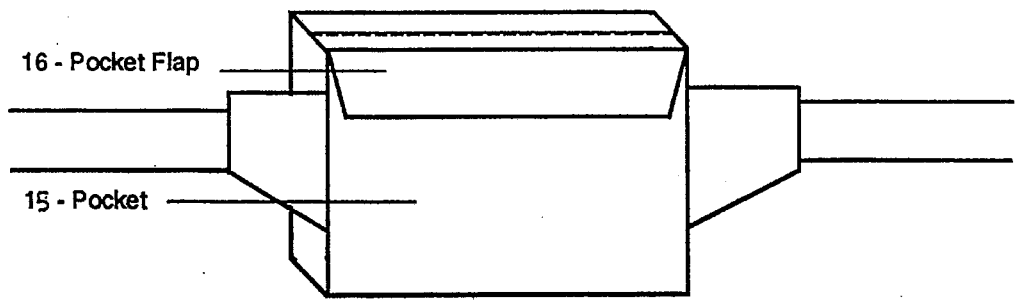
FIGURE 3B BACK VIEW
FIGURE 3C TOP VIEW
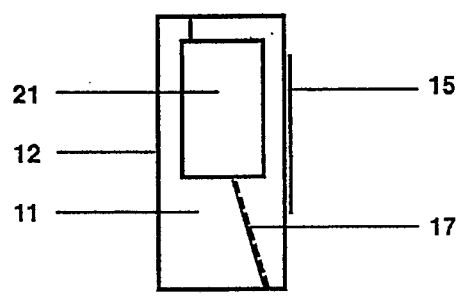
FIGURE 3D SIDE VIEW

HEADBAND ASSEMBLY

HANDS FREE VIDEO CAMERA SYSTEM

This is a continuation of Ser. No. 08/055,725, filed on Apr. 29, 1993 now abandoned.

FIELD OF INVENTION

This invention relates to hands free video camera systems, specifically such systems as used by sports enthusiasts and physically active individuals during their activities.

BACKGROUND OF INVENTION

Portable video camera systems are known in the art; however, these systems suffer from various limitations which do not make them desirable for use by sports enthusiasts and people involved in highly active endeavors. Existing self-contained video recording systems, such as camcorders, require that the users hold the device with at least one hand. Existing video cameras, that operate separate from an attached video recording device, either require the user to hold the camera with at least one hand or require the user to attach the device to their body in such a fashion that the user has limited control of the specific image that is recorded by a directional recording device. In addition, such devices limit the user's freedom of movement by weight and its cumbersomeness. Video cameras, such as the "helmet-cam" used in sporting events such as the "World Football League," transmit a video signal to a stationary and detached recording device. Through my research and to my knowledge, there are no existing self-contained recording devices which allows complete freedom of movement while accurately tracking the line of sight of the user.

SUMMARY OF INVENTION

The invention is a hands free video recording system, which is free from the ordinary requirement of being supported by the hands of the user, which operates as an independent unit, and which does not limit the freedom of movement of the user. The invention is comprised of a video camera, a microphone, a recording unit, a regulated power supply, a protective case and a support for the camera on the user's body.

The camera support is designed to direct the focal point of the camera lens in the same direction as the user's line of sight, allowing the camera to track and view the same images as the user is seeing with his or her eyes.

The regulated power supply is designed to ensure that the camera, the recording unit and the microphone all receive appropriate voltages for operation.

The protective case, made of a rigid material, surrounded by padding and a flexible outer covering, is designed to separate the recording unit and the power supply and to protect the recording unit and the regulated power supply from damage.

BRIEF DESCRIPTION OF DRAWINGS

FIG. 1 is a view of the headband assembly.

FIG. 3A–3D is the protective case assembly which houses the system assembly.

Figure 4:
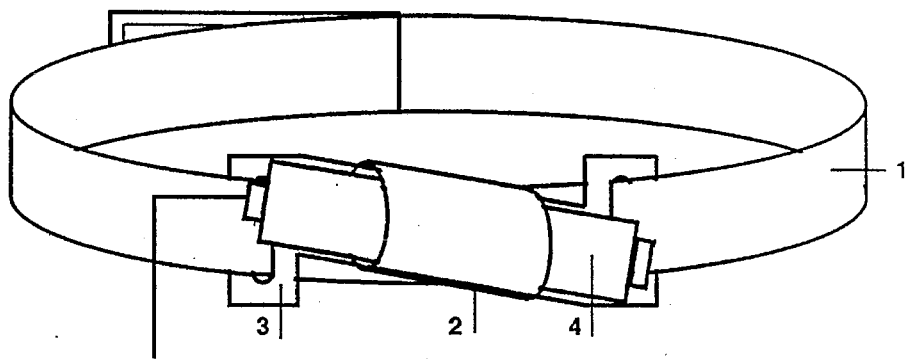
FIG. 4–4A is the system assembly including the headband assembly.
Figure 4A:
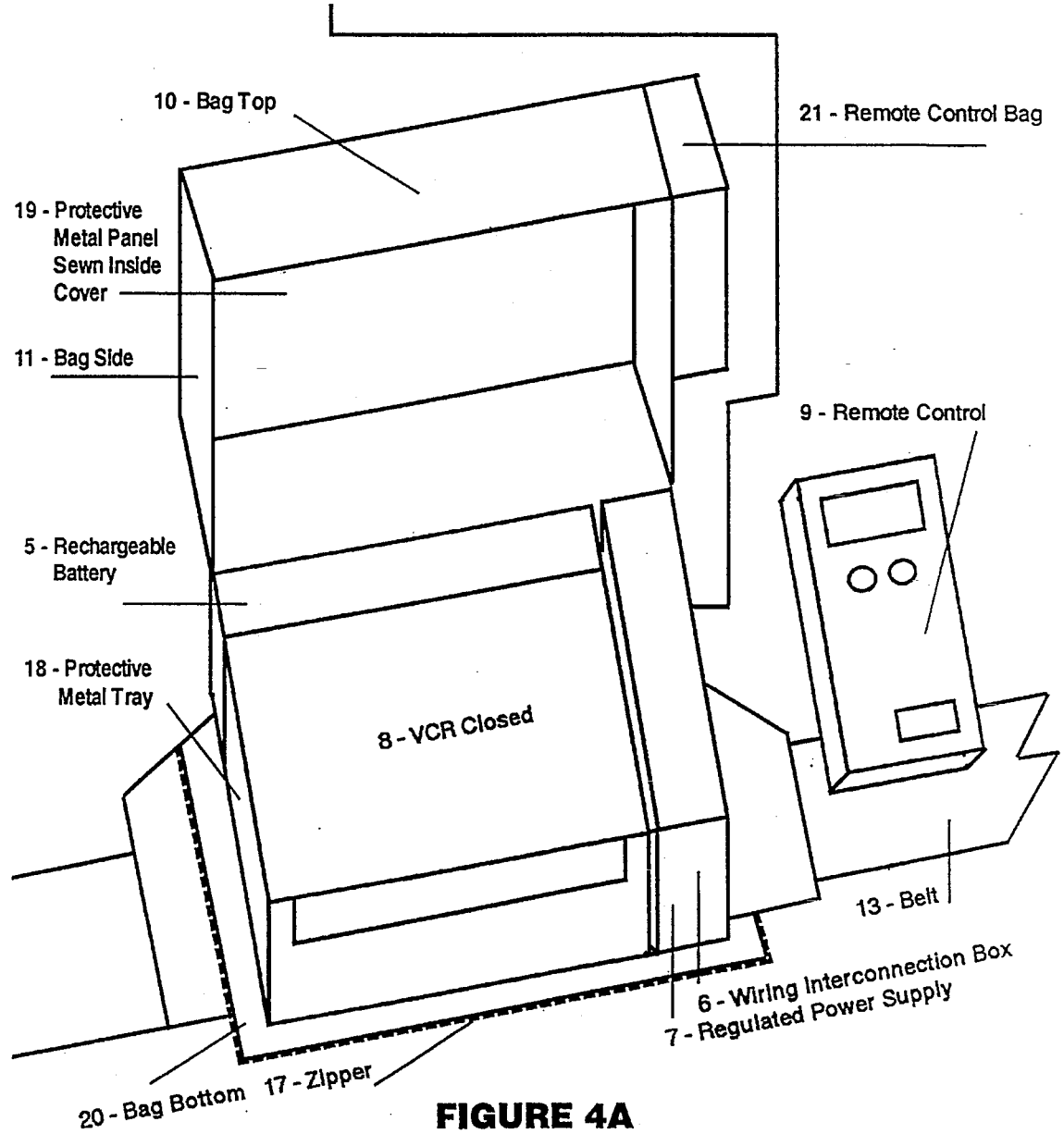

Referring to the drawings, specifically to FIG. 1, the headband assembly, consists of the following. A headband, 1, is a flexible band (fabric or neoprene) with velcro strips attached to each band. The elastic sleeve, 2, is attached to the headband which holds the camera. The "Z" angle, 3, is a rigid strip (plastic) with slots. The "Z" angle is slipped onto the headband; first, from one end of headband-through the elastic sleeve-and then through the second end of the headband. The camera, 4, is mounted on the headband and held in place via the elastic sleeve. A cable is connected from the camera to the other components in the system (FIG. 4A).

With the "Z" Angle, 3, and camera, 4, installed in the headband, 1 the headband is then placed on the user's head. The velcro strips are attached to hold the headband, 1, in place. The arrangement is positioned so that the camera, 4, has the same field of view as that of the user. The camera, 4, will then follow the motion of the user's head. The "Z" Angle, 3, and the elastic sleeve, 2, maintain the proper alignment of the camera.

Figure 2:
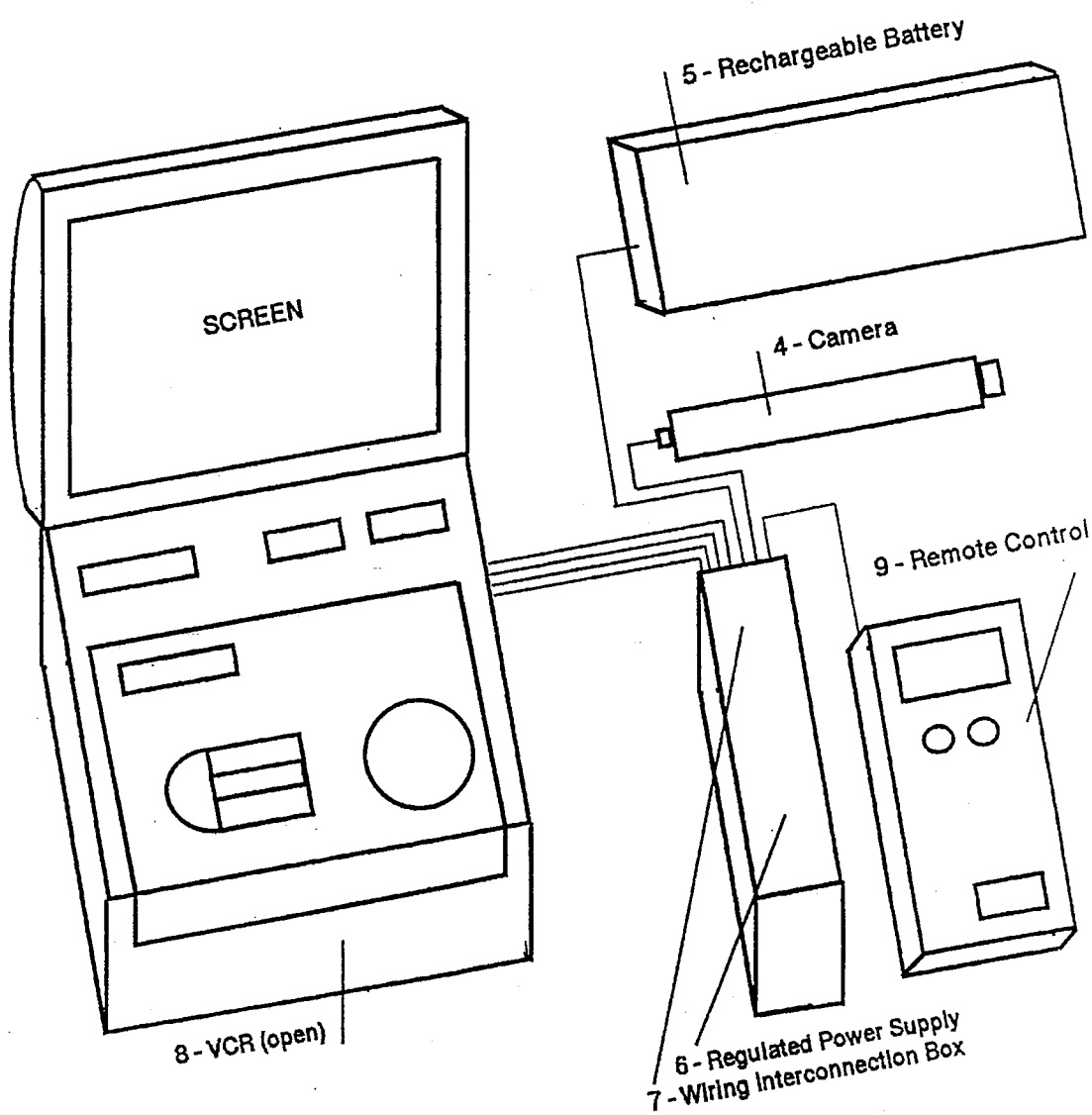
FIG. 2–2A is a perspective view of the major component assembly.
Figure 2A:
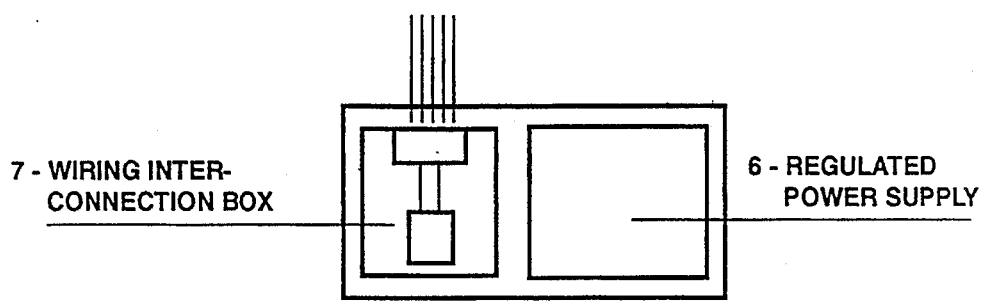

Referring to FIG. 2 and FIG. 2A, the view of major components, the Hands Free Video Camera consists of several components all integrated into a complete system. The camera, 4, is mounted onto the headband. The rechargeable battery, 5, can be removed, replaced and/or recharged, and reinstalled with ease. The regulated power supply, 6, maintains and distributes power to the system and provides precision voltage at all times. The wiring interconnecting box, 7, houses all of the wiring from the various components in the system and are all interconnected at the interconnecting box (motherboard). The VCR, 8, performs all typical functions of the VCR (i.e. record, stop, play, etc.) The remote control unit, 9, provides the user of the system complete control of all operations desired power (on-off-which starts camera and VCR, record, play, fast forward, and rewind).

The camera, 4, rechargeable battery, 5, VCR, 8, remote control unit, 9, are all interconnected to the wiring interconnecting box, 7. This integration provides capability to manage the system via the remote control unit, 9.

Referring to FIG. 3A–3D, the protective case is designed to be a multiuse container. The protective case is worn by the user and contains the components while the system is in use, or is used to contain all the components of the system when used as a carrying case. The protective case is comprised of the following elements. The top of the protective case, 10. The side pouch, 21-used to house the remote control. The front of the protective case, the adjustable belt, 13, and buckle, 14, adjustable to fit the wearer is held in place by the plastic snap-in buckle. The pocket, 15, located on the back of the bag is used to store the camera, 4, and camera cable when the system is not in use. The pocket flap, 16, made of a rigid material, is used to enclose the pocket, 15. The zipper, 17, is used to completely encase the contents of the protective case.

Referring to FIG. 4A, the system assembly, this drawing is a view of the components as they fit into the protective case. FIG. 4 is a view of the headband assembly as previously discussed in FIG. 1. FIG 4A consists of the rechargeable battery, 5, the wiring interconnecting box, 6, the regulated power supply, 7, the VCR, 8, the remote control unit, 9, the side of protective case, 11, the top of protective case, 13, the bottom of protective case, 20, the zipper, 17, the protective metal tray, 18. The metal tray, 18, encloses the VCR on three sides-back, left, and right sides). The protective metal panel, 19, is placed inside a sewn compartment in the front of the protective case and protects the components in the protective case from damage.

Note:

Plastic foam is set inside the protective metal tray, 18, for protective and insulation purposes.

BEST MODE/DESCRIPTION OF PREFERRED EMBODIMENT

In the preferred embodiment, the video camera would be a cylindrical commercially available lightweight video camera, not more than six ounces, the recording unit would be a videocassette recorder, and the power supply would be composed of a rechargeable battery and a voltage regulator which would ensure that the video camera and the recording unit each receive the appropriate voltages. The protective case would contain the recording unit and the power supply, each in a separate padded compartment, and the case would be supported on the user's body by a waist band. The video camera would be supported on the head of the user by a head band and a rigid "Z" shaped member which directs the video camera's focal point in the direction of the user's primary field of vision. Alternatively, the camera would be mounted on a helmet. A cable electrically connects the video camera to the members in the protective case, where the cable provides sufficient slack to allow the user to move freely.

I claim:

1. A hands free video recording system comprising:

a video camera including image pickup means for transducing an object image into an electrical video signal;

a microphone including audio pickup means for transducing auditory information into an electrical audio signal;

a recording unit, remotely located and electrically connectable to said camera and said microphone, to record the electrical video and audio signals;

a power supply electrically connectable to said camera, to said microphone, and to said recording unit;

a protective case for supporting the recording unit and power supply;

means for mounting the camera on a side of a user's head above the user's eye level and outside of the peripheral vision of the user, where the camera's image pickup means is presented with visual information within a line of sight of the user's eyes and where said mounting means is located directly lateral to the user's head;

means for removably locating the microphone on the user's body; and means for supporting the protective case and the recording unit on the user's body, said protective case and recording unit being remotely located from said camera.

2. The hands free video recording system of claim 1, where the camera mounting means comprises:

a head band;

rigid support means adjustably attached to the head band; and means for attaching the camera to the head band proximate to the rigid support means, where the rigid support means supports the camera and directs the camera's image pickup means towards the user's field of vision relative to the orientation of the user's body.

3. The hands free video recording system of claim 1, where the protective case comprises:

a flexible outer covering, defining an internal volume, where the outer covering may be fastened to isolate the internal volume from the outside;

a rigid outer member within the outer covering, providing definition for the internal volume;

a rigid dividing member separating the internal volume into distinct compartments;

a malleable covering surrounding the interior surfaces of the rigid dividing member and the rigid outer member, said malleable covering containing resilient shock-absorbing material; and means for supporting the protective case.

4. The hands free video recording system of claim 3, where the supporting means comprising a flexible adjustable belt.

5. The hands free video recording system of claim 3, where the means for locating the protective case comprises a shoulder strap.

6. A hands free video recording system comprising:

a video camera including image pickup means for transducing an object image into an electrical video signal;

a microphone including audio pickup means for transducing auditory information into an electrical audio signal;

a recording unit, remotely located and electrically connectable to said camera and said microphone, to record the electrical video and audio signals;

a power supply electrically connectable to said camera, to said microphone, and to said recording unit;

a protective case for supporting the recording unit and power supply;

a head band;

rigid support means adjustably attached to the head band, the rigid support means being a "Z" angle slotted strip running along a length of the head band, where the rigid support means is proximate to the side of the user's head;

means for attaching the camera to the head band proximate to the rigid support means, the camera being attached along a central length of the "Z" angle, where the rigid support means supports the camera and directs the camera's image pickup means toward the user's field of vision relative to the orientation of the user's body, and where the camera is located outside of the peripheral vision of the user;

means for removably locating the microphone on the user's body; and means for removably locating the protective case and the recording unit on the user's body, said protective case and recording unit being remotely located from said camera.

7. The hands free video recording system of claim 1, where the camera mounting means comprises:

a helmet; and means for attaching the camera to the helmet, where the attaching means is located on a side of the helmet, supports the camera outside of the peripheral vision of the user and directs the camera's image pickup means towards the user's field of vision relative to the orientation of the user's body.

8. The hands free video recording system of claim 2, wherein the rigid support means is a slotted strip running along a length of the head band.

9. The hands free video recording system of claim 8, wherein the rigid support means is a "Z" angle.

10. The hands free video recording system of claim 9, wherein the camera is attached along a central length of the "Z" Angle.

11. A hands free video recording system, comprising:

a camera means for providing a video signal, the camera means attached to a user above the user's eye level, such that a field of view of the camera means tracks the user's line of sight, where the camera means is located directly lateral to the user's head and outside of the peripheral vision of the user;

a recording means for receiving the video signal, the recording means storing the video signal on a recording medium;

a means for controlling the recording means and the camera means, the controlling means attached to the user's body such that the controlling means is supported without the user's hands but is accessible by the user's hands.

12. The hands free video recording system of claim 6:

where the video camera is attached along a central length of the "Z" angle of the rigid support means; and where the rigid support means supports the video camera on a side of the user's head.

13. A hands free video recording system comprising:

a camera including image pickup means for transducing an object image into an electrical video signal;

a microphone including audio pickup means for transducing auditory information into an electrical audio signal;

a recording unit, remotely located and electrically connectable to said camera and said microphone, to record the electrical video and audio signals;

a protective case for supporting and protecting the recording unit and power supply;

a head band;

a rigid support means located directly lateral to the user's head above the user's eye level and adjustably attached to the head band;

means for attaching the camera to the head band proximate to the rigid support means, where the rigid support means supports the camera on a side of the user's head outside of the peripheral vision of the user and directs the camera's image pickup means toward the user's field of vision.

* * * * *